(No Model.)
T. BURKHARD, Jr.
APPARATUS FOR COOLING OR HEATING CANDY.
No. 337,303. Patented Mar. 2, 1886.
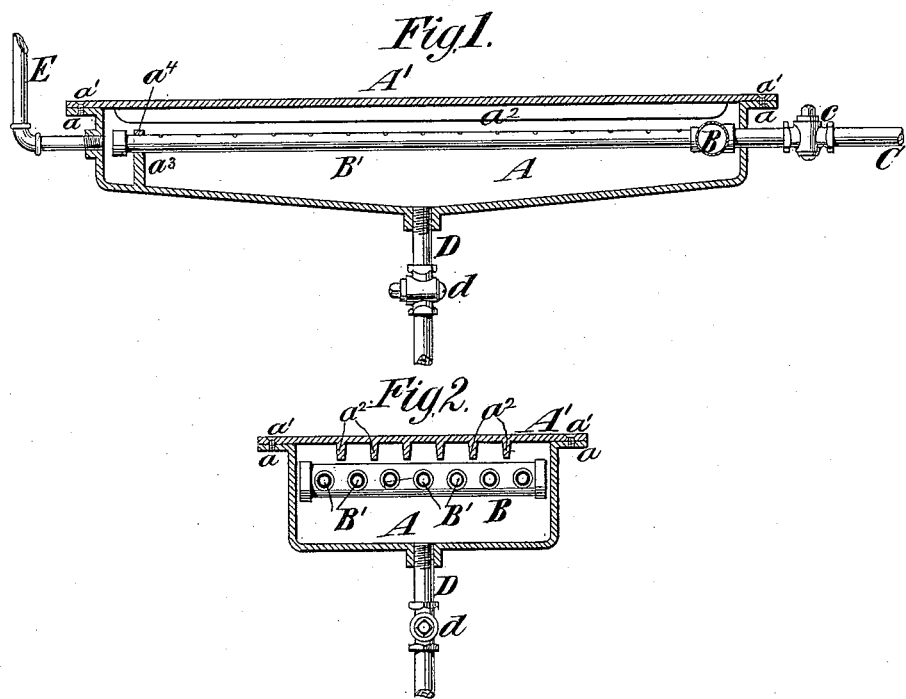
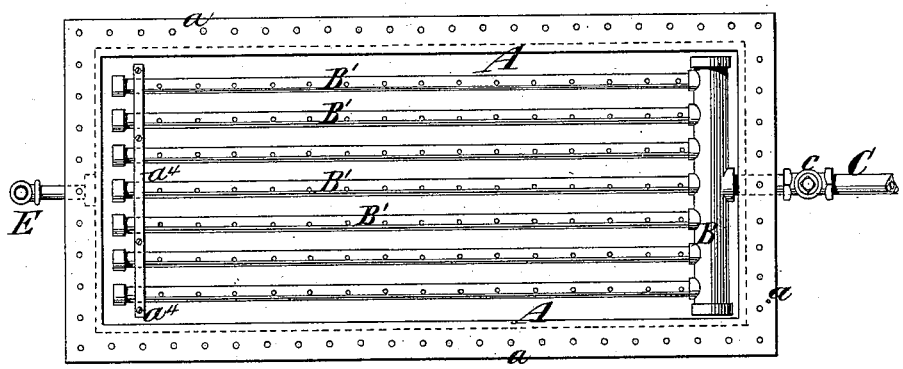
Witnesses:
Emil H Curtis
C. Sundgren
Inventor.
Thomas Burkhard Jr.
by his Attys
Brown & Hall
N. PETERS, Photo-Lithographer, Washington, D. C.

UNITED STATES PATENT OFFICE.

THOMAS BURKHARD, JR., OF BROOKLYN, NEW YORK, ASSIGNOR OF ONE-HALF TO THOMAS BURKHARD, SR., OF SAME PLACE.

APPARATUS FOR COOLING OR HEATING CANDY.

SPECIFICATION forming part of Letters Patent No. 337,303, dated March 2, 1886.

Application filed December 3, 1885. Serial No. 184,547. (No model.)

*To all whom it may concern:*

Be it known that I, THOMAS BURKHARD, Jr., of Brooklyn, in the county of Kings and State of New York, have invented a new and useful Improvement in Apparatus for Cooling or Heating Candy and other Substances, of which the following is a specification.

My invention relates more particularly to apparatus comprising a flat horizontal surface or plate on which the candy may be placed, and provision for properly applying a cooling or heating agent to this plate, in order to produce the cooling or heating of the candy; but such apparatus may be employed for cooling or heating other substances, if desired. In cooling apparatus which comprises a hollow chamber provided with inlet and outlet pipes for the cooling agent, as usually constructed, the surface of the apparatus will not be uniformly and equally cooled, because the cooling agent will be coldest at the point where it enters and warmest where it makes its exit, and if such apparatus be used for heating the candy or other substance it will not be uniformly heated, because the heating agent will be at its greatest temperature at its point of entrance, and will be cooler or reduced in temperature before it makes its exit from the apparatus.

The object of my invention is to provide a cooling or heating apparatus in which the cooling or heating agent will be more effectively employed than heretofore in heating or cooling the plate or surface on which the candy or other substance is placed.

The invention, in what I now consider its most approved form, consists of a closed chamber having a flat top plate whereon candy or other substance may be placed, and which is provided on the under side with longitudinal strengthening-ribs. Within this closed chamber is arranged a header or distributing-sow, from which a number of parallel pipes extend through the chamber. The opposite ends of the parallel pipes are closed or plugged up, and a supply-pipe admits the cooling or heating agent to the header. The several pipes extending from the header are perforated in their upper portions, so that the cooling or heating agent will be delivered by them directly against the top plate of the closed chamber, and such distributing-pipes are arranged between and below the longitudinal strengthening-ribs of the top plate, so that the jets or streams of cooling or heating fluid delivered by them will strike directly upon the thinner portions of the top plate and will most effectively accomplish their work. From the bottom of the closed chamber there extends an outlet-pipe, through which escapes the spent cooling-fluid, whether it be water which has become heated by contact with the top plate, or water of condensation resulting from the condensation of steam employed in heating.

The invention consists in novel combinations of parts, which are hereinafter described, and pointed out in the claims.

In the accompanying drawings, Figure 1 is a longitudinal section of a cooling or heating apparatus embodying my invention. Fig. 2 is a transverse section thereof; and Fig. 3 is a plan of the cooling or heating apparatus, the top plate being removed.

Similar letters of reference designate corresponding parts in all the figures.

A designates the closed chamber, which may be of cast metal, and the top portion of which is formed by the plate A', affording a flat upper surface, on which candy or other substances to be operated upon may be placed. The body portion of the chamber A may be provided with a flange, $a$, and by screws or bolts $a'$ the top plate, A', may be secured to the body portion of the chamber. The top plate, A', is provided on the under side with longitudinal strengthening-ribs $a^2$, which give the plate sufficient stiffness when cast as thin as is possible, in order to give the cooling or heating agent most effect.

Extending across one end of and within the chamber is a distributing-header, B, from which extend parallel pipes B'. The opposite ends of these pipes are closed by caps, plugs, or otherwise, and they are represented as supported at their ends remote from the header by a bridge or flange, $a^3$, cast in the chamber A. The bridge or flange $a^3$ may be notched, so as to receive the pipes B', and the pipes may be held in place therein by a bar, $a^4$, extending across above them and secured to the bridge or flange.

The cooling or heating agent is supplied to the header B by a pipe, C, in which is a cock or valve, c, and the several parallel distributing-pipes B' are perforated in their upper portions, as shown, so that the cooling or heating agent will be projected upward against the top plate, A', and will therefore be most effective in cooling or heating such plate.

As best shown in Fig. 2, the pipes B' are arranged below and between the longitudinal ribs $a^2$ of the top plate, A', so that the cooling or heating agent delivered from the pipes will strike the thin portions of the plate A' between the ribs $a^2$. I have also shown a drip-pipe, D, extending from the bottom of the chamber, and provided with a cock or valve, d, and the bottom of the chamber is sloped longitudinally in opposite directions toward the pipe D, so that it will drain itself. I have likewise shown a vent-pipe, E, extending upward from one end of the chamber A.

By the header B and the distributing-pipe B', perforated in their upper portions, the cooling or heating agent will be uniformly distributed throughout the entire chamber, and the top A' will be uniformly cooled or heated, so as to produce the best results.

What I claim as my invention, and desire to secure by Letters Patent, is—

1. In an apparatus for cooling or heating candy and other substances, the combination, with a horizontally-extending closed chamber, the top plate of which forms a surface for the candy or other substance, of a header in the chamber, and pipes extending therefrom through the chamber and perforated for the escape of the cooling or heating agent, and pipes for supplying such agent to the header, and for the discharge of the spent agent from the chamber, substantially as herein described.

2. The combination, with the chamber A, having an outlet-pipe, of the header B and the pipes B', extending therefrom and perforated in their upper portion, so as to deliver the cooling or heating agent directly against the top plate of the chamber, and the pipe C, for supplying the header with the cooling or heating agent, substantially as herein described.

3. The combination, with the chamber A, having its top plate, A', provided with longitudinal ribs $a^2$, and its outlet-pipe D, of the header B and the distributing-pipes B', extending therefrom, arranged between the ribs $a^2$, and perforated in their upper portions, and the pipe C, for supplying the header with the cooling or heating agent, substantially as herein described.

THOS. BURKHARD, JR.

Witnesses:
 FREDK. HAYNES,
 HENRY MCBRIDE.